United States Patent [19]

Tappen et al.

[11] 3,862,672
[45] Jan. 28, 1975

[54] QUICK-CHANGE DRIVE UNIT
[75] Inventors: Harold B. Tappen; John Roy Corwin, both of Richmond, Ind.
[73] Assignee: Eaton Corporation, Cleveland, Ohio
[22] Filed: July 12, 1973
[21] Appl. No.: 378,468

[52] U.S. Cl. ................ 184/6.12, 74/325, 74/413, 74/607
[51] Int. Cl. ................ F01m 11/02, F16h 3/08
[58] Field of Search .......... 74/325, 606 R, 607, 413, 74/421 R, 420; 184/6, 6.2, 11 A, 11 R, 6.12

[56] References Cited
UNITED STATES PATENTS

| | | | |
|---|---|---|---|
| 2,269,916 | 1/1942 | Price | 74/606 R |
| 2,324,676 | 7/1943 | Butterfield | 308/236 |
| 2,566,253 | 8/1951 | Schmitter | 74/325 |
| 2,755,686 | 7/1956 | Bade | 74/325 |
| 2,775,308 | 12/1956 | Senkowski et al. | 74/606 R |
| 2,869,384 | 1/1959 | Schmitter | 184/6.12 |
| 3,403,568 | 10/1968 | Holcombe | 74/325 X |
| 3,481,421 | 12/1969 | Sullivan | 184/6 X |

Primary Examiner—Samuel Scott
Assistant Examiner—John Reep
Attorney, Agent, or Firm—Teagno & Toddy

[57] ABSTRACT

An improved, quick-change drive unit includes a one-piece housing which has a first cavity at its forward end, a second cavity at its rearward end, and a transversely-extending middle wall portion having first and second passages therethrough which communicate with the first and second cavities. An input shaft extends from the first cavity, through one of the passages in the middle wall portion to the second cavity where a detachable drive change gear meshes with a similar detachable change gear on a drive pinion shaft. The drive pinion shaft extends from the rear cavity through the other passage in the middle wall into the first cavity where its pinion gear head meshes with a drive gear coupled to an output member. A removable rear cover plate permits easy access for changing the detachable gears to selectively vary the drive ratio of the unit.

The housing configuration is such to provide improved bearing supports for the input and drive pinion shafts while also including provisions for a lubrication system whereby the level of lubricant in the first cavity is maintained basically independent of the lubricant level in the second cavity even though the attitude of the housing becomes excessively tilted during use.

8 Claims, 5 Drawing Figures

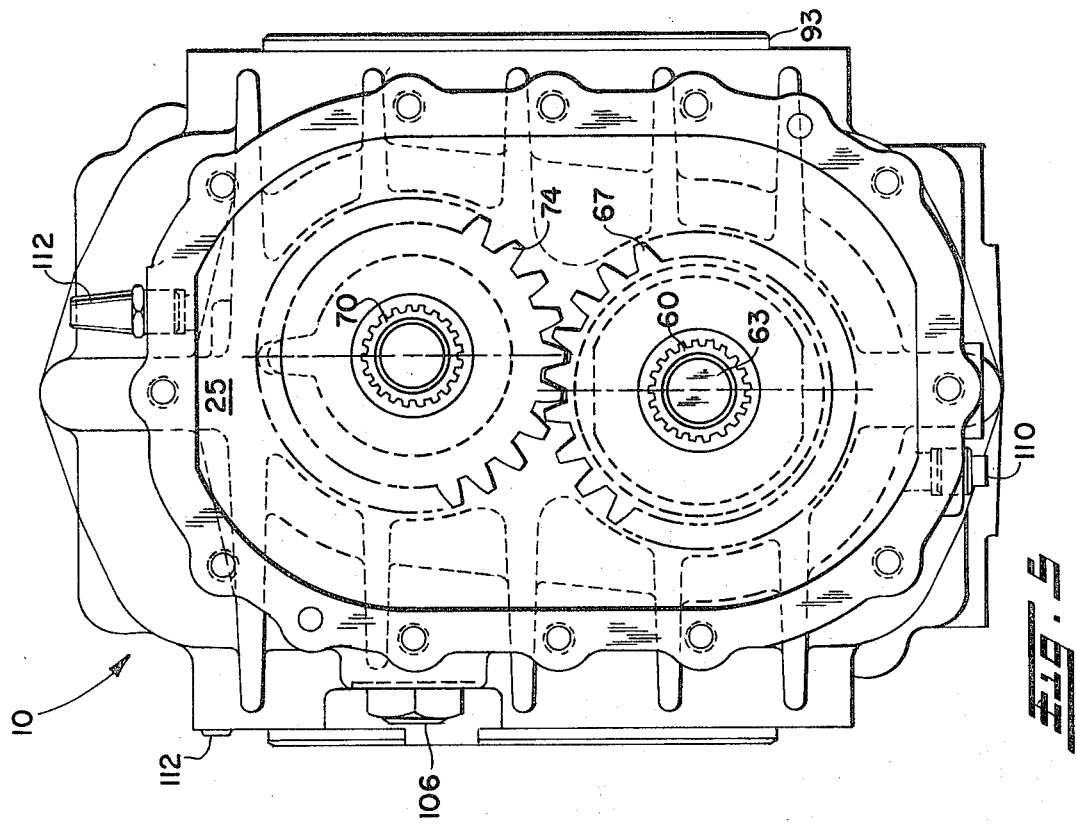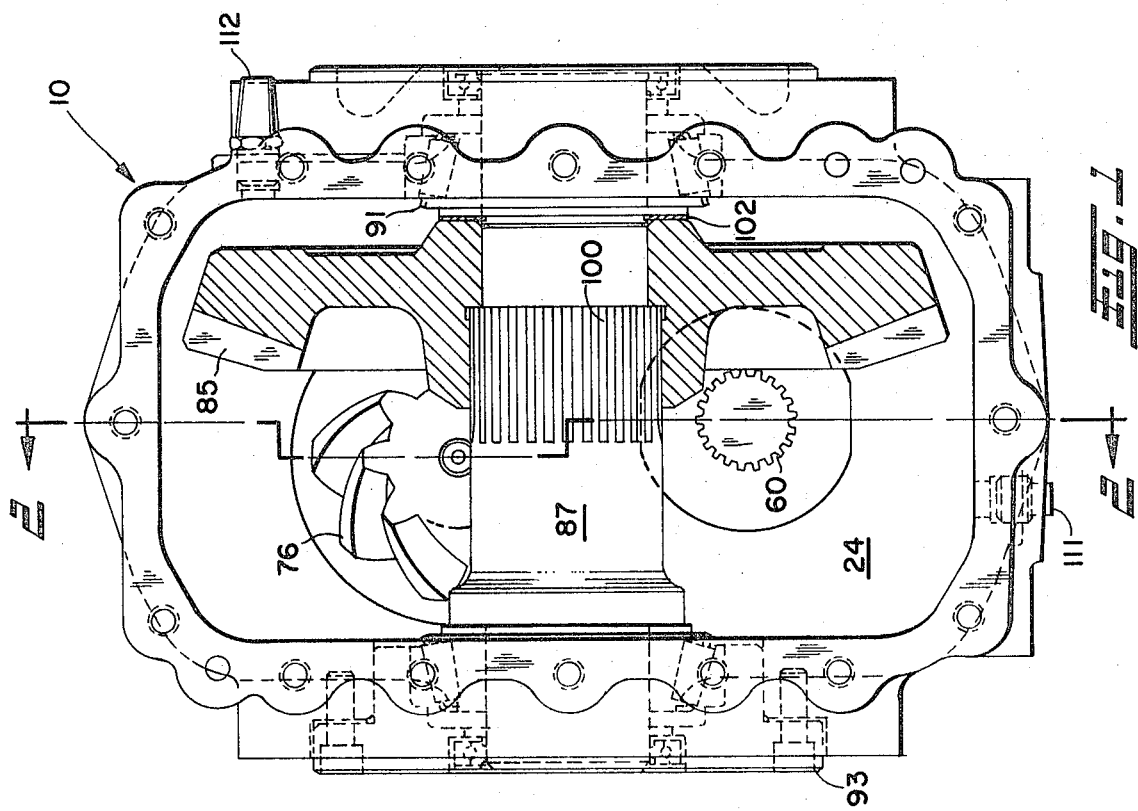

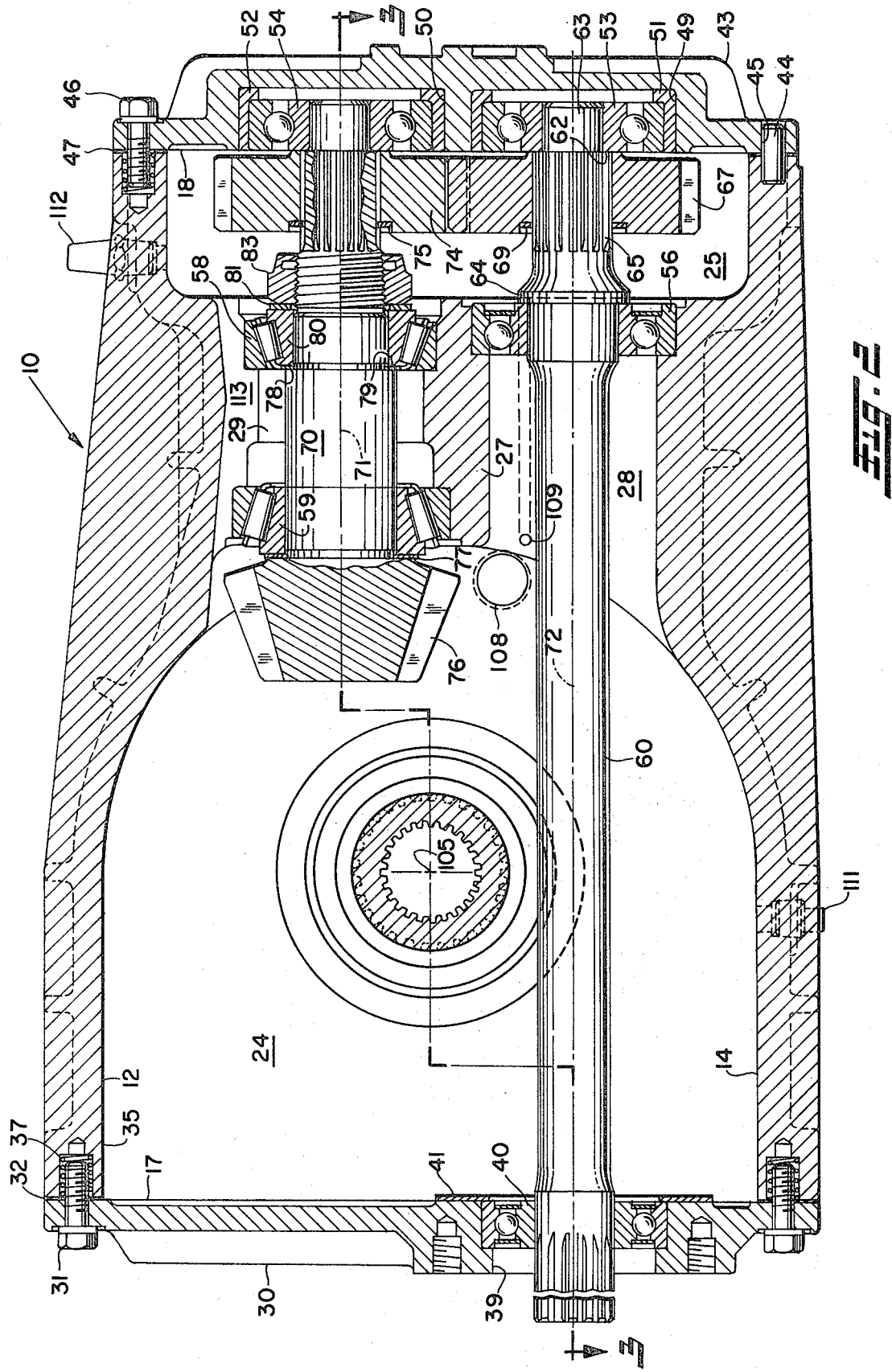

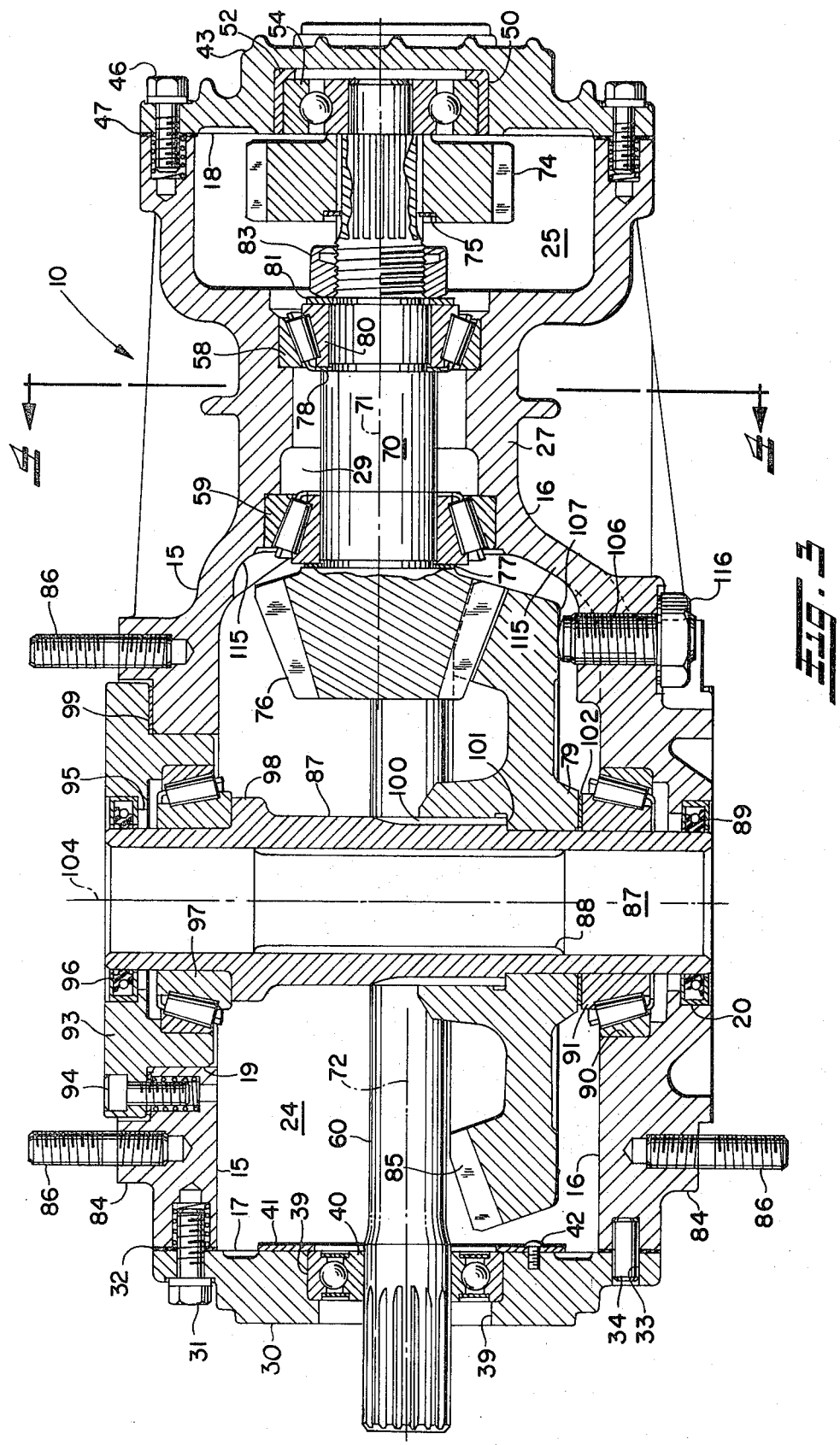

QUICK-CHANGE DRIVE UNIT

This invention relates generally to a quick-change drive unit and more particularly to the housing for a quick-change drive unit.

The invention is particularly applicable to a drive axle unit for use in drag racing vehicles, such as dragsters, and will be described with particular reference thereto. However, it will be appreciated by those skilled in the art that the invention has broader applications and can be used wherever a quick-change drive is desired, for example; as a stirrer for chemicals or as a batter for bakery equipment or as a quick-change axle unit for farm tractors, etc.

Quick-change axle units for racing vehicles are old in the art and reference may be had to U.S. Pat. Nos. 3,645,153; 2,776,572; and 2,245,078 for typical illustrations of same. Heretofore the axle housing structures employed in such devices have been generally inadequate for drag racing-type vehicles in that separating forces developed such high loads that side cover plates were literally blown off the housing. Also, deflection of the gear shafts resulting from instantaneous application of torque were high enough to result in serious power losses and in some instances failure. Further lubrication of the components within the housing failed because of instantaneous acceleration and the attitude or pitch of the housing in the dragster. This caused the axle components at the front of the drive unit to run dry while the components at the rear end were flooded.

It is thus an object of the subject invention to provide a quick-change drive unit having a one-piece housing which provides improved lubrication of the component parts therein while also structurally supporting such parts in a superior manner than heretofore possible.

In accordance with the invention, this feature is achieved by providing a one-piece drive unit housing having an open forward end, an open rearward end, and an opening in at least one side surface. Within the housing adjacent the forward end is a first cavity and a second cavity is adjacent the rearward end with a contiguous, transversely-extending middle wall portion dividing the first cavity from the second cavity. Within the middle wall portion are bottom and top generally cylindrical passages providing communication between the first and second cavities. Front, rear, and side cover plates are provided for their respective openings.

An input shaft extends through the first cavity, the bottom passage, and into the second cavity. Detachably mounted to the input shaft portion within the second cavity is a first drive change gear. The first gear is in meshing, driving engagement with a second drive change gear mounted on a drive pinion shaft that extends from the second cavity through the top passage into the first cavity. The pinion gear head of the drive pinion in turn is in meshing, driving engagement with a drive gear in the first cavity which is splined to an axle drive spool for rotating axle shafts received therein. The removable rear cover plate provides easy access to the drive change gears whereby the drive ratio of the unit is varied.

The improved support for the input shaft consists of spaced bearing supports which include a first, sealed bearing in the front cover, a second sealed bearing in the bottom passage adjacent the second cavity, and a third bearing in the rear cover plate with the input shaft shouldered between the second and third bearings to reduce axial shaft movement. The improved support for the drive pinion includes a fourth bearing in the rear cover plate, a fifth bearing in the top passage adjacent the second cavity, and a sixth bearing in the top passage adjacent the first cavity; the pinion shaft bearing arrangement preventing shaft tilting while also doing away with necessity of an arm cast into the housing to support the front end of the pinion gear head.

The lubrication system includes a fill hole at the side of the housing axially positioned to assure proper lubrication of bearings seven and eight. A levelling hole near the fill hole in the transverse middle wall portion provides communication between the first and second cavities since the second bearing, being sealed, prevents lubricant flow from the first to second cavity through the bottom passage. The levelling hole permits the second cavity to be filled to the same level as the first cavity while, importantly, preventing rapid loss of lubricant from the first cavity to the second cavity when the rear end of the housing pitches downward as the dragster accelerates.

The lubrication system also includes a lubricating slot within the upper wall of the housing extending between the first and second cavities and communicating with the upper portion of the top passage. The slot tapers downwardly from a maximum opening adjacent the first cavity to a minimum opening adjacent the second cavity. Lubricant flows into the slot to lubricate the fifth and sixth bearings by means of a curvilinear wall blend configuration between the first cavity and the middle wall portion and the angular configuration of the slot permits lubricant to drip onto the fifth and sixth bearings even after the vehicle has stopped.

The invention may take physical form in certain parts and arrangement of parts, a preferred embodiment of which will be described in detail herein and illustrated in the accompanying drawings which form a part hereof and wherein:

FIG. 1 is a front, end elevation view of the housing of the subject invention with the front cover plate removed and the drive gear sectioned;

FIG. 2 is a sectioned elevation view of the housing taken along Line 2—2 of FIG. 1;

FIG. 3 is a sectioned plan view of the housing taken along Line 3—3 of FIG. 2;

FIG. 5 is a rear, end elevation view of the housing with the rear cover plate removed.

Figure 4:
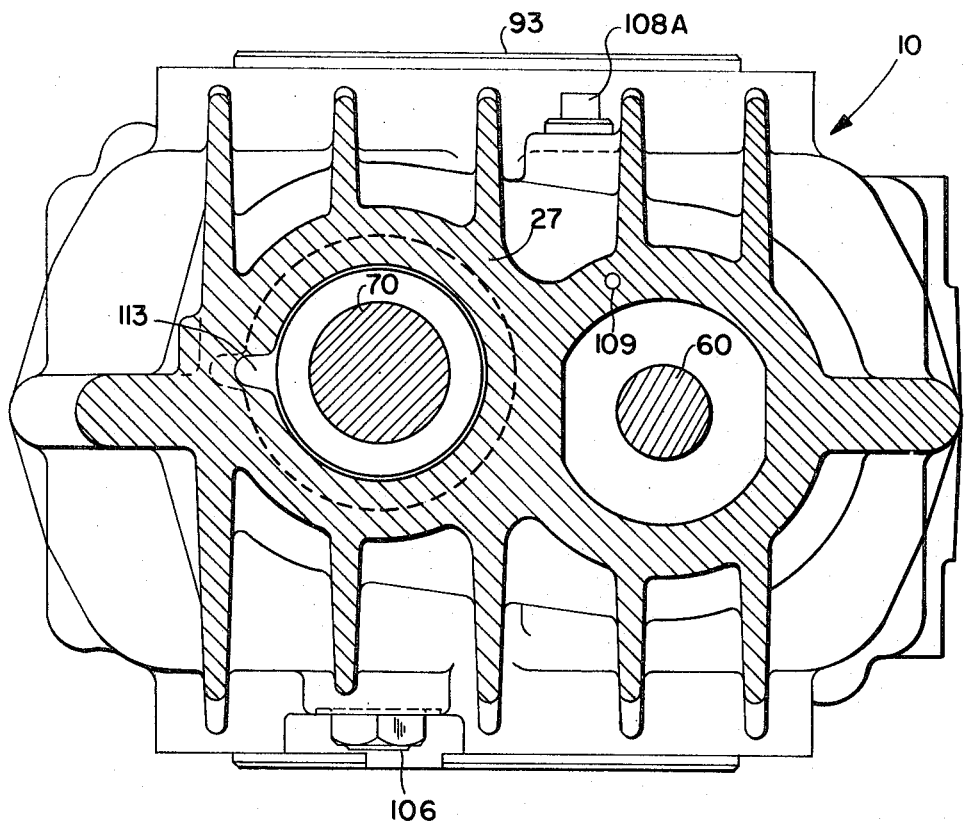
FIG. 4 is a cross-section view of the transverse middle wall portion of the housing taken along Line 4—4 of FIG. 3.

Referring now to the drawings wherein the showings are for the purpose of illustrating a preferred embodiment of the invention only and not for the purpose of limiting same, there is shown a unitary housing 10 preferably cast from a light weight material such as aluminum or magnesium and a material grade having good shock absorbing characteristics.

The unitary housing 10 includes top and bottom wall surfaces 12,14 (FIG. 2) and right and left sidewall surfaces 15,16 (FIG. 3) respectively, all wall surfaces being shown as ribbed to improve their strength. The housing has an open forward end 17, an open rearward end 18, and openings 19,20 in sidewall surfaces 15,16 respectively. The interior of the housing is configured to define a first cavity 24 adjacent the open forward end 17 and a second cavity 25 adjacent the rearward end 18. Transversely extending between the first and second cavities 24,25 is a contiguous middle wall portion 27 which in turn has a bottom, generally-cylindrical, first passage 28 and a top, generally-cylindrical, second passage 29 extending therethrough. Passages 28,29, as shown in FIG. 4, are generally parallel to one another and provide communication between the first and second cavities 24,25.

A ribbed front cover plate 30 is secured to the housing forward end 17 by a plurality of bolts 31 to sealingly compress a gasket 32 therebetween. Alignment of front cover plate 30 with housing forward end 17 is assured by a pair of dowel pin holes 33 (FIG. 3) in the front cover plate which are located with respect to a pair of dowel pins 34 provided in the housing forward end. The bolt holes in the housing forward end are like all cover plate holes in the housing and so are not herein mentioned again and they are provided with known spring-type fasteners 37 therein which permit bolts 31 to be repeatedly torqued into bolt holes 35 without stripping which otherwise would occur if the bolt holes 35 were tapped only.

An opening 39 is provided in front cover plate 30 to receive a first bearing 40 shown provided with a double seal. Bearing 40 is pressed into opening 39 and retained therein by a bearing retainer plate 41 secured to the front cover by three threaded screws 42.

A ribbed rear cover plate 43 is aligned, as the front plate was, with rearward end 18 by a pair of dowel pins 44 (FIG. 2) locating into dowel holes 45 in the rear cover plate 43. Rearward plate 43 is bolted to the housing 10 by a plurality of bolts 46 which compress gasket 47 to seal the rear end 18 of the housing. Within the interior of the rear cover plate 43 are first and second circular recesses 49,50 each of which receives a semihardened steel liner 51,52 pressed therein which in turn receive third and fourth bearings 53,54 respectively.

A second bearing 56 is pressed into the first passage 28 at a position adjacent the second cavity 25 and because second bearing 56 is shown sealed, communication between the first and second cavities 24,25 by means of first passage 28 is prevented. Pressed into second passage 29 is a fifth bearing 58 of the tapered roller-bearing type adjacent second cavity 25 and spaced therefrom a sixth bearing 59 adjacent the first cavity 24, also of the tapered roller-bearing type.

First, second, and third bearings 40,56,53 are axially aligned with one another and journal an input shaft 60 therein. Input shaft 60 thus extends from the front end 17 of the housing through the first cavity 24, the first passage 28 and into the second cavity 25. the input shaft portion within second cavity 25 has a first shoulder 62 formed at the shaft juncture of the bearing pilot end 63 received in the third bearing 53 so that first shoulder 62 abuts the cup or inner race of third bearing 53. At the opposite end of the shaft portion within second cavity 25, a flanged shoulder 64 abuts the cup or inner race of the second bearing 56. Shoulders 62,64 reduce axial movement of shaft 60 when under load within second cavity 25 while also functioning as stops for their respective bearings once rear cover plate 43 is fastened to the housing. The input shaft portion within second cavity 25 is shown splined as at 65 to receive in a detachable manner a first drive change spur gear 67 which has an opening similarly splined. Spur gear 67 is axially located on input shaft 60 by a snap ring 69 positioned within a recess in the input shaft.

The fourth, fifth, and sixth bearings 54,58,59 likewise journal a drive pinion shaft 70 which extends from the second cavity 25 through the second passage 29 and into the first cavity 24; the drive pinion shaft being rotatably supported on an axis 71 which is parallel to the input shaft axis 72 (FIG. 2). The portion of the drive pinion shaft 70 within the second cavity 25 is similar to the input shaft construction and carries a second spur gear 74 axially positioned on the drive pinion shaft by snap ring 75, which gear 74 is in meshing, driving engagement with the first spur gear 67. Thus gears 67,74 are easily accessible from the exterior of the housing when rear cover plate 43 is removed and the drive ratio of the unit can be quickly and easily changed by inserting a different pair of change gears.

Pinion shaft 70 has a pinion gear head 76 which is adapted to be in tooth engagement with a drive gear 85 in the first cavity. To assure full tooth contact and proper pinion mounting distance, a first shim 77 is placed between a shoulder formed at the rear of the pinion gear head and the bearing cone of the sixth bearing 59. A second shim 78 which maintains proper spacing for bearing preload is placed between a shoulder 79 on the drive pinion shaft and the bearing cone 80 of the fifth bearing 53. A hardened bearing washer 81 is placed on the opposite side of bearing cone 80 and is maintained compressed against the bearing cone 80 by a jam nut 83 threaded onto the pinion shaft 70. Jam nut 83, in addition to compressing shims 77,78 also functions to reduce axial movement, skewing or cocking of the drive pinion shaft 70 under gear load.

Extending within first cavity 24 perpendicular to drive pinion shaft 70 and between side openings 19,20 is a hollow, generally cylindrical, axle drive spool 87 (FIG. 3). Drive spool 87 is shown splined about a portion of its interior surface as at 88 whereby the spool is adapted to receive a pair of similarly splined output members or axle shafts (not shown) which are thus fixed for common rotation with the drive spool. Each axle shaft is encased within an axle tube (not shown) which is secured to an exterior boss portion 84 formed on each sidewall surface 15,16 by means of a plurality of studs 86.

A seal 89 is provided in the left side opening 20 through which the drive spool extends and a recess 90 in the left sidewall 16 receives a seventh bearing 91 for journalling one end of the drive spool 87. The opposite opening 19 in the right sidewall 15 of the housing receives a side cover plate 93 secured to right sidewall 15 by a plurality of bolts 94 spaced circumferentially thereabout. Side cover plate 93 has a central opening 95 extending therethrough which receives a second seal 96 and an eighth bearing 97 for journalling and sealing the other end of the axle drive spool 87 in the housing. A third shim 99 for preloading eighth bearing 97 and adjusting backlash between gear 85 and pinion 76 is provided between side cover plate 93 and right sidewall 15.

Splined to an exterior portion of the drive spool 87 as at 100 is the aforementioned drive gear 85. The splined portion 100 of the drive spool 87 is shouldered to receive a similarly stepped hub portion 101 of the drive gear 85 to thereby compress a fourth shim 102 between the bearing cone of the seventh bearing 91 and the drive gear 85 for preloading the drive gear bearings and adjusting the backlash between gear 85 and pinion 76.

In the embodiment shown drive gear 85 is mounted in the first cavity 24 with its rotational axis 104 perpendicular to rotational axes 71,72 of the drive pinion and input shafts 70,60 respectively. However, as best shown in FIG. 2, the rotational axis 105 of the drive gear 85 is offset from the rotational axis 71 of the drive pinion shaft 70 resulting in a below center hypoid application; the pinion gear head 76 shown with left hand spiral teeth and the drive gear 85 shown with right hand spiral teeth. To prevent deflection of drive gear 85 under load, a deflection retaining stud 106 extends through the left hand sidewall 16 of the housing in an adjustable manner. Deflection retaining stud 106 is nominally adjusted to contact the back side surface 107 of drive gear 85 upon 0.010 inch deflection of the drive gear. Stud 106 is secured in position with locknut 116.

The lubrication system of the subject invention includes a fill hole 108 (FIG. 2) located in the right sidewall 15 of the housing which extends into the first cavity 24 and is axially aligned with at least a portion of the first passage 28. Within passage 28 and axially aligned with the bottom of fill hole 108 is a smaller levelling hole 109. The levelling hole 109 is shown positioned near the fill hole and opens to the second cavity 25 thereby providing fluid communication between the first and second cavities (FIG. 4).

A first drain plug 110 (FIG. 5) is provided in bottom wall surface 14 adjacent second cavity 25 for draining the second cavity. A second drain plug 111 (FIGS. 1,2) is also provided in bottom wall surface 14 adjacent the first cavity 24 for draining the first cavity. Positive ventilation of the lubrication system to atmosphere is assured by a first breather filter 112 (FIG. 2) in the top wall surface 12 communicating with second cavity 25 and a second breather filter 112 (FIGS. 1 and 3) in sidewall surface 16 communicating with the first cavity 24.

In accordance with another aspect of the lubrication system, a lubricating slot 113 (FIGS. 2,4) is cast in the top wall surface 12 of the housing and opens to the top center portion of the second passage 29 to provide lubricant to the fifth and sixth bearings 58,59. Lubricating slot 113 is shown tapering or angular with maximum opening adjacent the first cavity 24 and minimum opening adjacent the second cavity 25. Lubricant is forced by vehicle acceleration into slot 113 by the blend configuration between housing wall surfaces defining the intersection of the first cavity 25 and the second passage 29. More particularly this curvilinear blend configuration is shown in FIG. 2 as a vertical radial wall surface designated as 114 blending with a second wall surface designated as 115 in FIG. 3, a portion of which is likewise radial. The blend configuration guides the lubricant into cast hole 113 during forward motion of the vehicle and the angular configuration of lubricating slot 113 causes oil to drip between bearings 58,59 even after the vehicle is stopped. Additionally the radial wall surface 114 also floods the seventh and eighth bearings 91,97 during forward motion of the vehicle.

In operation, power to the input shaft 60 is transmitted to the first spur change gear 67 which drives the second spur change gear 74 which in turn rotates the drive pinion shaft 70 causing the pinion gear head 76 to rotate the drive gear 85. Drive gear 85 simultaneously rotates the axle drive spool 87 and axle shafts connected to the vehicle's rear wheels. When the drive ratio is to be changed, the second cavity 25 is emptied by drain plug 110. This does not drain the lubricant from the first cavity 24 because same is sealed from the second cavity 25 by the sealed second ball bearing 56. The rear cover plate bolts 46 are removed and the rear cover plate 43 pulled from the input and pinion shaft pilot ends for inserting different drive change gears. The procedure is reversed for assembly except that when filling cavity 25, fill plug 108A and breather 112 (in cavity 25) are removed. Cavity 25 is slowly filled through 112 breather hole until oil runs out of hole 108; then fill plug 108A and breather 112 (in cavity 25) are replaced.

Because the levelling hole is located near the fill hole 108, the housing 10 must be pitched rearwardly in an excessive direction or vehicle instantaneously accelerated during operation of the dragster before the lubricant flow reaches the levelling hole 109. Further, even if either this extreme tilt position or instantaneous acceleration was achieved, an excessive amount of lubricant would not flow from the first cavity to the second cavity, because of the small size of levelling hole 109 (¼ to 5/16 inch). By thus sealing the second cavity from the first cavity, the lubricant level is maintained in each cavity assuring proper lubrication of the component parts within each cavity.

The invention has been described with reference to a preferred embodiment. Obviously modifications and alterations will occur to others, upon reading and understanding the specification. For example the housing could be modified to receive a differential in place of the axle drive spool and helical gears in place of the spur gears to provide a drive arrangement for passenger-type, recreational vehicles. It is our intention to include all such modifications and alterations insofar as they come within the scope of the present invention.

It is thus the essence of the invention to provide a unitary, quick-change drive housing which provides an improved support means and a unique lubricating arrangement for the component drive parts.

Having thus defined our invention, we claim:

1. A quick-change drive unit comprising:
   a housing having at least one open side and open forward and rearward ends and further including a first cavity adjacent said forward end, a second cavity adjacent said rearward end and a contiguous, transversely-extending middle wall portion inbetween said first and second cavities, said wall having upper and lower substantially parallel passages extending therethrough and communicating said first and second cavities with one another;
   a front cover plate removable sealingly secured to said forward end, a rear cover plate removable sealingly secured to said rearward end, and a side plate removably sealingly secured to said open side;
   an input shaft extending through said front cover, said first cavity, said lower passage and into said second cavity, and secured in said housing in a rotatable manner;
   a selectively detachable first gear affixed to that portion of said input shaft within said second cavity;
   a drive pinion shaft extending from said second cavity through said upper passage and into said first cavity, said drive pinion shaft secured in said housing in a rotatable manner;

a selectively detachable second gear affixed to that portion of said drive pinion shaft within said second cavity, said second gear in meshing, driving engagement with said first gear, removal of said rear cover plate providing easy access to said detachable gears for substitution with an alternate pair of detachable gears whereby the drive ratio of said unit is varied in a predetermined manner;

a drive gear in said first cavity in meshing, driving engagement with the pinion gear head of said drive pinion shaft;

output means connected to said drive gear for transmitting rotation of said drive gear to an output member;

a first bearing in said front cover plate, a second bearing in said lower passage adjacent said second cavity and a third bearing in said rear cover plate, said first, second, and third bearings axially aligned with one another and journalling said input shaft;

a fourth bearing in said gear cover plate, a fifth bearing in said upper passage adjacent said second cavity and a sixth bearing in said upper passage adjacent said first cavity and spaced from said fifth bearing, said fourth, fifth, and sixth bearings axially aligned with one another and journalling said drive pinion; and lubricating means for lubricating the components of said unit, said lubricating means including;

said second bearing having a seal thereabout preventing said lower passage from providing fluid communication between said first cavity and said second cavity;

said housing having a fill opening at a side of said housing located at a point axially aligned with and communicating with a least a portion of said lower passage for filling said first cavity with lubricant;

a generally restricted levelling hole in said middle wall providing communication between said lower passage and said second cavity, said levelling hole generally aligned with said fill opening; and a first and second drain plug located in the bottom walls of said first and second cavities respectively whereby each of said cavities may be separately drained of lubricant without drainage of the other cavity.

2. The quick-change drive unit of claim 1 wherein said upper and lower passages are generally circular in cross section; and said housing further having an upper wall surface, a cast slot in said upper wall surface communicating with the top portion of said upper passage, said slot extending from said first cavity to said second cavity and having a tapering opening greater at said first cavity than said second cavity.

3. The quick-change drive axle of claim 2 wherein said first cavity blends with said middle wall portion in a generally curvilinear configuration to assure lubricant flow in said slot.

4. The quick-change drive unit of claim 1 wherein the axis of said input shaft is below the axis of drive gear, the axis of said drive pinion shaft and pinion gear head is above the axis of said drive gear and said housing includes a deflection retention member for contact with a surface of said drive gear upon predetermined deflection of said drive gear to prevent greater than said predetermined deflection of said drive gear.

5. A quick-change drive axle for use in a dragster or the like comprising:

a housing having a open forward end, an open rearward end, an opening in one of its sides, a first cavity adjacent said forward end, a second cavity adjacent said rearward end, and a transversely-extending middle wall portion separating said first cavity from said second cavity, said wall portion having a first generally cylindrical bottom passage extending therethrough to provide communication between said first and second cavities and a second generally cylindrical top passage extending therethrough, said top passage generally parallel to said bottom passage and providing communication between said first and second cavities;

a front cover plate for securement to said forward end, a rear cover plate for securement to said rearward end and a side cover plate for securement to said side opening;

an input shaft extending through said first cavity, said first passageway and into said second cavity;

a first sealed bearing within said front cover plate, a second sealed bearing within said first passage adjacent said second cavity and a third bearing within said rear cover plate, said first, second, and third bearings axially aligned with one another and journalling said input shaft within said housing, said input shaft having a flanged shoulder within said second cavity abutting said second bearing and a bearing pilot end received within said third bearing, said third bearing received within a steel bearing liner pressed into said rear cover plate;

a drive pinion shaft extending from said second cavity through said second passage and into said first cavity;

a fourth bearing within said rear cover plate, a fifth bearing in said second passage adjacent said second cavity and a sixth bearing in said second passage adjacent said first cavity and spaced from said fifth bearing, said fourth, fifth and sixth bearings axially aligned with one another and journalling said drive pinion shaft within said housing, said drive pinion having a jam nut in said second cavity abutting said fifth bearing and a bearing pilot end received within said fourth bearing, said fourth bearing received within a steel bearing liner pressed within said rear cover plate;

a first spur gear detachably mounted on said input shaft in said second cavity and a second spur gear in meshing, driving engagement with said first gear, mounted on said drive pinion shaft in said second cavity;

a drive gear within said first cavity in meshing, driving engagement with a pinion gear head on said drive pinion shaft;

output means connected to said drive gear and extending at least through said side opening for rotating an output member; and means in said middle wall portion for providing lubricant flow from said first cavity to said second cavity, said means including a seal in said second bearing preventing fluid communication between said first and second cavities through said bottom passage, a fill opening in the side of said housing axially aligned and communicating with at least a portion of said bottom passage, a levelling hole within said middle wall portion providing fluid communication between said bottom passage and said second cavity, said levelling hole generally aligned with said fill opening;

said housing further having an upper wall surface, cast slot in said upper wall surface communicating with the top of said first passage and extending from said first cavity to said second cavity, said slot having a tapering opening greater at said first cavity than said second cavity; and said first cavity blending with said middle wall in a generally curvilinear configuration to provide lubricant flow to said slot.

6. The quick-change drive axle of claim 5 wherein said housing is magnesium.

7. The quick-change drive axle of claim 5 wherein the axis of said input shaft is below the axis of said drive gear, the axis of said pinion gear is above the axis of said drive gear, said drive and pinion gears are hypoid gears and said housing is provided with an abutment member for abutment with a surface of said drive gear upon a predetermined deflection of said drive gear.

8. The quick-change drive axle of claim 5 wherein said first and second chambers have separate drain plugs in the bottom walls thereof.

* * * * *